US008554732B2

(12) United States Patent  (10) Patent No.: US 8,554,732 B2
Clark et al.  (45) Date of Patent: *Oct. 8, 2013

(54) VERSION MANAGEMENT FOR APPLICATION EXECUTION ENVIRONMENT

(75) Inventors: Jeremy R. Clark, San Rafael, CA (US); Oliver Goldman, Los Altos, CA (US); Luis Polanco, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 13/079,575

(22) Filed: Apr. 4, 2011

(65) Prior Publication Data

US 2013/0166509 A1  Jun. 27, 2013

Related U.S. Application Data

(63) Continuation of application No. 11/875,764, filed on Oct. 19, 2007, now Pat. No. 7,930,273.

(60) Provisional application No. 60/952,816, filed on Jul. 30, 2007.

(51) Int. Cl.
  *G06F 7/00* (2006.01)
  *G06F 17/00* (2006.01)

(52) U.S. Cl.
  USPC ........... 707/638; 707/610; 707/620; 717/121; 717/170

(58) Field of Classification Search
  None
  See application file for complete search history.

(56) References Cited

U.S. PATENT DOCUMENTS

| 5,157,763 A | 10/1992 | Peters et al. |
| 5,301,268 A | 4/1994 | Takeda |
| 5,555,416 A | 9/1996 | Owens et al. |
| 5,606,674 A | 2/1997 | Root |
| 5,625,809 A | 4/1997 | Dysart et al. |
| 5,694,563 A | 12/1997 | Belfiore et al. |
| 5,781,192 A | 7/1998 | Kodimer |
| 5,784,058 A | 7/1998 | LaStrange et al. |
| 5,801,693 A | 9/1998 | Bailey |
| 5,835,777 A | 11/1998 | Staelin |

(Continued)

FOREIGN PATENT DOCUMENTS

| WO | 0043913 | 7/2000 |
| WO | 0049545 | 8/2000 |

OTHER PUBLICATIONS

In U.S. Appl. No. 11/760,685, Final Office Action dated Sep. 14, 2011, to be published by United States Patent and Trademark Office, 25 pages.

(Continued)

*Primary Examiner* — Robert Beausoliel, Jr.
*Assistant Examiner* — Susan F Rayyan
(74) *Attorney, Agent, or Firm* — Wolfe-SBMC

(57) ABSTRACT

Methods, systems, and apparatus, including medium-encoded computer program products, for managing an application execution environment on a computer. One or more aspects of the subject matter described in this specification can be embodied in one or more methods of managing an application execution environment, the one or more methods including: identifying which of multiple different versions of the application execution environment are installed on a computer; and managing the different versions of the application execution environment on the computer; wherein the identifying and the managing are performed using one or more of the different versions of the application execution environment.

17 Claims, 6 Drawing Sheets

(56) References Cited

U.S. PATENT DOCUMENTS

| | | |
|---|---|---|
| 5,860,012 A | 1/1999 | Luu |
| 5,886,699 A | 3/1999 | Belfiore et al. |
| 5,924,099 A | 7/1999 | Guzak et al. |
| 5,999,740 A | 12/1999 | Rowley |
| 6,009,274 A | 12/1999 | Fletcher et al. |
| 6,028,965 A | 2/2000 | Normile |
| 6,043,816 A | 3/2000 | Williams et al. |
| 6,061,058 A | 5/2000 | Owens et al. |
| 6,067,582 A | 5/2000 | Smith et al. |
| 6,125,388 A | 9/2000 | Reisman |
| 6,199,204 B1 | 3/2001 | Donohue |
| 6,202,207 B1 | 3/2001 | Donohue |
| 6,216,152 B1 | 4/2001 | Wong et al. |
| 6,272,493 B1 | 8/2001 | Pasquali |
| 6,301,710 B1 | 10/2001 | Fujiwara |
| 6,314,565 B1 | 11/2001 | Kenner et al. |
| 6,321,209 B1 | 11/2001 | Pasquali |
| 6,374,401 B1 | 4/2002 | Curtis |
| 6,378,128 B1 | 4/2002 | Edelstein et al. |
| 6,385,766 B1 | 5/2002 | Doran, Jr. et al. |
| 6,418,555 B2 | 7/2002 | Mohammed |
| 6,433,794 B1 | 8/2002 | Beadle et al. |
| 6,434,563 B1 | 8/2002 | Pasquali et al. |
| 6,496,979 B1 | 12/2002 | Chen et al. |
| 6,535,882 B2 | 3/2003 | Pasquali |
| 6,536,040 B1 | 3/2003 | Curtis |
| 6,539,539 B1 | 3/2003 | Larsen et al. |
| 6,546,554 B1 * | 4/2003 | Schmidt et al. ............... 717/176 |
| 6,557,054 B2 | 4/2003 | Reisman |
| 6,601,236 B1 | 7/2003 | Curtis |
| 6,606,744 B1 | 8/2003 | Mikurak |
| 6,618,857 B1 | 9/2003 | Zimniewicz et al. |
| 6,629,316 B1 | 9/2003 | Curtis |
| 6,636,856 B2 | 10/2003 | Pasquali |
| 6,651,249 B2 | 11/2003 | Waldin et al. |
| 6,654,765 B2 | 11/2003 | Wong et al. |
| 6,658,419 B2 | 12/2003 | Pasquali |
| 6,687,745 B1 | 2/2004 | Franco et al. |
| 6,748,591 B1 | 6/2004 | Lewallen |
| 6,757,365 B1 | 6/2004 | Bogard |
| 6,785,885 B2 | 8/2004 | Norris et al. |
| 6,803,929 B2 | 10/2004 | Hinegardner et al. |
| 6,839,714 B2 | 1/2005 | Wheeler et al. |
| 6,874,142 B1 | 3/2005 | Ogura |
| 6,904,569 B1 | 6/2005 | Anderson |
| 6,944,821 B1 | 9/2005 | Bates et al. |
| 6,948,166 B2 | 9/2005 | Barfield et al. |
| 6,961,907 B1 | 11/2005 | Bailey |
| 7,032,220 B2 | 4/2006 | Curtis |
| 7,080,139 B1 | 7/2006 | Briggs et al. |
| 7,085,817 B1 | 8/2006 | Tock et al. |
| 7,127,405 B1 | 10/2006 | Frank et al. |
| 7,260,818 B1 | 8/2007 | Iterum et al. |
| 7,263,545 B2 | 8/2007 | Digate et al. |
| 7,275,243 B2 | 9/2007 | Gibbons et al. |
| 7,287,097 B1 | 10/2007 | Friend et al. |
| 7,293,242 B2 | 11/2007 | Cossey et al. |
| 7,296,244 B2 | 11/2007 | Martinez et al. |
| 7,299,259 B2 | 11/2007 | Petrovykh |
| 7,305,453 B2 | 12/2007 | Awamoto et al. |
| 7,310,781 B2 | 12/2007 | Chen et al. |
| 7,337,210 B2 | 2/2008 | Barsness |
| 7,340,512 B2 | 3/2008 | Cochran et al. |
| 7,370,278 B2 | 5/2008 | Malik et al. |
| 7,383,308 B1 | 6/2008 | Groves et al. |
| 7,383,356 B2 | 6/2008 | Gargi |
| 7,386,841 B2 | 6/2008 | Huang et al. |
| 7,395,500 B2 | 7/2008 | Whittle et al. |
| 7,409,405 B1 | 8/2008 | Masinter et al. |
| 7,434,048 B1 | 10/2008 | Shapiro et al. |
| 7,440,980 B2 * | 10/2008 | Fletcher et al. ............... 1/1 |
| 7,451,218 B2 | 11/2008 | Malik et al. |
| 7,461,098 B2 * | 12/2008 | Fletcher et al. ............... 1/1 |
| 7,478,336 B2 | 1/2009 | Chen et al. |
| 7,505,998 B2 | 3/2009 | Barrett |
| 7,523,116 B2 | 4/2009 | Yan |
| 7,617,458 B1 | 11/2009 | Wassom et al. |
| 7,664,834 B2 | 2/2010 | Keith, Jr. |
| 7,698,698 B2 | 4/2010 | Skan |
| 7,703,090 B2 | 4/2010 | Napier et al. |
| 7,711,771 B2 | 5/2010 | Kimos |
| 7,752,574 B2 | 7/2010 | Dere |
| 7,793,281 B2 | 9/2010 | Goring et al. |
| 7,797,403 B2 | 9/2010 | Vedula et al. |
| 7,814,476 B2 | 10/2010 | Ho |
| 7,853,336 B2 * | 12/2010 | Grgic et al. ............... 700/11 |
| 7,907,966 B1 | 3/2011 | Mammen |
| 7,913,248 B1 | 3/2011 | Lynch et al. |
| 7,930,273 B1 | 4/2011 | Clark et al. |
| 7,934,210 B1 | 4/2011 | Stampfli et al. |
| 7,934,212 B2 | 4/2011 | Lakhdhir |
| 7,987,460 B2 * | 7/2011 | Lo et al. ............... 717/174 |
| 2001/0034244 A1 | 10/2001 | Calder et al. |
| 2002/0049633 A1 | 4/2002 | Pasquali |
| 2002/0055975 A1 | 5/2002 | Petrovykh |
| 2002/0069264 A1 | 6/2002 | Pasquali |
| 2002/0080179 A1 | 6/2002 | Okabe et al. |
| 2002/0103902 A1 | 8/2002 | Nagel et al. |
| 2002/0122068 A1 | 9/2002 | Tsuruoka |
| 2003/0037327 A1 | 2/2003 | Cicciarelli et al. |
| 2003/0037328 A1 | 2/2003 | Cicciarelli et al. |
| 2003/0050932 A1 | 3/2003 | Pace et al. |
| 2003/0163807 A1 | 8/2003 | Drake et al. |
| 2003/0187929 A1 | 10/2003 | Pugh et al. |
| 2003/0208491 A1 | 11/2003 | Pasquali |
| 2004/0088694 A1 | 5/2004 | Ho |
| 2004/0093563 A1 | 5/2004 | Pasquali |
| 2004/0111478 A1 | 6/2004 | Gross et al. |
| 2004/0143633 A1 | 7/2004 | McCarty |
| 2004/0194082 A1 | 9/2004 | Purkeypile et al. |
| 2004/0205134 A1 | 10/2004 | Digate et al. |
| 2004/0230967 A1 | 11/2004 | Yuknewicz et al. |
| 2004/0243997 A1 | 12/2004 | Mullin et al. |
| 2004/0267804 A1 | 12/2004 | Fresko et al. |
| 2005/0021652 A1 | 1/2005 | McCormack |
| 2005/0044191 A1 | 2/2005 | Kamada et al. |
| 2005/0044545 A1 | 2/2005 | Childress et al. |
| 2005/0049960 A1 | 3/2005 | Yeager |
| 2005/0066019 A1 | 3/2005 | Egan et al. |
| 2005/0086290 A1 | 4/2005 | Joyce et al. |
| 2005/0086640 A1 | 4/2005 | Kolehmainen et al. |
| 2005/0097061 A1 | 5/2005 | Shapiro et al. |
| 2005/0097082 A1 | 5/2005 | Yan |
| 2005/0108369 A1 | 5/2005 | Sather et al. |
| 2005/0172241 A1 | 8/2005 | Daniels et al. |
| 2005/0198581 A1 | 9/2005 | Soderberg et al. |
| 2005/0203892 A1 | 9/2005 | Wesley et al. |
| 2005/0210401 A1 | 9/2005 | Ketola et al. |
| 2005/0257128 A1 | 11/2005 | Pasquali et al. |
| 2005/0262521 A1 | 11/2005 | Kesavarapu |
| 2006/0025091 A1 | 2/2006 | Buford |
| 2006/0026590 A1 | 2/2006 | Berenberg et al. |
| 2006/0047946 A1 | 3/2006 | Keith, Jr. |
| 2006/0048129 A1 | 3/2006 | Napier et al. |
| 2006/0048130 A1 | 3/2006 | Napier et al. |
| 2006/0048140 A1 | 3/2006 | Boctor et al. |
| 2006/0070063 A1 | 3/2006 | Takashige et al. |
| 2006/0085796 A1 | 4/2006 | Hoerle et al. |
| 2006/0095524 A1 | 5/2006 | Kay et al. |
| 2006/0168575 A1 | 7/2006 | Bhatt et al. |
| 2006/0212329 A1 | 9/2006 | Lucas et al. |
| 2006/0271526 A1 | 11/2006 | Charnock et al. |
| 2007/0038993 A1 | 2/2007 | Corpening et al. |
| 2007/0220510 A1 | 9/2007 | Bell et al. |
| 2007/0234344 A1 | 10/2007 | Hamid et al. |
| 2008/0127169 A1 | 5/2008 | Malasky et al. |
| 2008/0127170 A1 | 5/2008 | Goldman et al. |
| 2008/0127175 A1 | 5/2008 | Naranjo et al. |
| 2008/0141241 A1 | 6/2008 | Mills |
| 2008/0244589 A1 | 10/2008 | Darnell et al. |
| 2009/0019436 A1 | 1/2009 | Hartz et al. |
| 2009/0037835 A1 | 2/2009 | Goldman |
| 2011/0072424 A1 | 3/2011 | Choi et al. |

(56) References Cited

OTHER PUBLICATIONS

Xiaorong Xiang, Service-Oriented Architecture For Integration of Bioinformatic Data and Applications [online], Apr. 2007, retrieved on Mar. 15, 2012, pp. 44-72. Retrieved from Internet: <URL: http://www.nd.edu/-mog/Papers/xiaorong_phd.pdf>.
G. Denys et al., A Survey of Customizability in Operating Systems Research [online], Dec. 2002, retrieved on Mar. 15, 2012, pp. 450-468. Retrieved from Internet: <URL: http://delivery.acm.org/10.1145/600000/592644/p450-denys.pdf?>.
Xiang, Xiaorong, Service-Oriented Architecture for Integration of Bioinformatic Data and Applications [online], Apr. 2007, retrieved on Mar. 15, 2012, pp. 44-72. Retrieved from Internet: <URL: http://www.nd.edu/-mog/Papers/xiaorong_phd.pdf>.
"Notice of Allowance", U.S. Appl. No. 11/875,764, (Nov. 18, 2010), 15 pages.
In U.S. Appl. No. 11/090,741, Non-Final Office Action dated Jun. 11, 2010, to be published by the United States Patent and Trademark Office, 47 pages.
U.S. Appl. No. 11/090,741, filed Mar. 25, 2005, in Office Action, mailed Aug. 28, 2008, 22 Pages.
U.S. Appl. No. 11/090,741, filed Mar. 25, 2005, in Office Action, mailed Mar. 6, 2009, 37 Pages.
U.S. Appl. No. 11/090,741, filed Mar. 25, 2005, in Office Action, mailed Aug. 6, 2009, 37 Pages.
U.S. Appl. No. 11/090,741, filed Mar. 25, 2005, in Office Action, mailed Jan. 7, 2010, 49 Pages.
In U.S. Appl. No. 11/282,916, Final Office Action dated Jul. 9, 2009, to be published by United States Patent and Trademark Office, 26 pages.
Corporate Portals Letter, vol. 1, No. 10, Oct. 2000, 3 pages.
In U.S. Appl. No. 11/282,916, filed Nov. 18, 2005, Non-Final Office Action dated Jan. 28, 2009, to be published by the United States Patent and Trademark Office, 15 pages.
In U.S. Appl. No. 11/282,217, filed Nov. 18, 2005, Non-Final Office Action dated Feb. 5, 2009, to be published by the United States Patent and Trademark Office, 16 pages.
In U.S. Appl. No. 11/282,217, Final Office Action dated Aug. 5, 2009, to be published by the United States Patent Office, 19 pages.
In U.S. Appl. No. 11/282,217, Non-Final Office Action dated Jan. 4, 2010, to be published by United States Patent and Trademark Office, 20 pages.
In U.S. Appl. No. 11/090,402, filed Mar. 25, 2005, Non-Final Office Action dated Nov. 19, 2007, to be published by United States Patent and Trademark Office, 9 pages.
In U.S. Appl. No. 11/090,402, Final Office Action, mailed Jul. 22, 2008, to be published by United States Patent and Trademark Office, 14 pages.
In U.S. Appl. No. 11/090,402, Final Office Action, mailed Jan. 9, 2009, to be published by United States Patent and Trademark Office, 18 pages.
In U.S. Appl. No. 11/090,402, Final Office Action dated Mar. 8, 2010, to be published by the United States Patent and Trademark Office, 34 pages.
In U.S. Appl. No. 11/090,402, Non-Final Office Action dated Aug. 6, 2009, to be published by United States Patent and Trademark Office, 24 pages.
In U.S. Appl. No. 11/089,699, filed Mar. 25, 2005, Non-Final Office Action dated Jun. 25, 2008, to be published by United States Patent and Trademark Office, 122 pages.
Kolehmainen et al., U.S. Appl. No. 60/513,050, titled: Systems and Methods for Facilitating Software Development and Communications Efficacy, filed Oct. 21, 2003, 37 pages.
Lambert, Karine, Authorized Officer, European Patent Office, in International Search Report for Application Serial No. PCT/US2008/066184, mailed Nov. 6, 2008, 15 pages, to be published by USPTO.
Lambert, Karine, Authorized Officer, European Patent Office, in International Search Report for Application Serial No. PCT/US2008/066188, mailed Nov. 6, 2008, 15 pages, to be published by USPTO.
Muller, Nathan J., "Focus on OpenView," Chapters 8, 9 and 10 (Mar. 1995).
Netscape 7.1 Upgrade Guide, 8 pages (2003).
In U.S. Appl. No. 11/280,714, filed Nov. 15, 2005, Non-Final Office Action dated Jun. 11, 2009, to be published by United States Patent and Trademark Office, 27 pages.
In U.S. Appl. No. 11/280,714, Final Office Action dated Dec. 24, 2009, to be published by United States Patent and Trademark Office, 34 pages.
U.S. Appl. No. 11/875,764, filed Oct. 19, 2007, in Office Action date Sep. 1, 2010, to be published by the United States Patent Office, 7 pages.
U.S. Patent Office, U.S. Appl. No. 11/875,764, filed Oct. 19, 2007, in Office Action, mailed Nov. 2, 2010, 5 pages.
RealPresenter™ Plug-in for use with Microsoft® PowerPoint® 97, User's Guide Version 5.0, Real Networks, Inc., 29 pages (1998).
Sun Microsystems, Inc., "Auto Downloading JREs using Java™ Web Start and Java™ Plug-in" [Online] Feb. 2007, pp. 1-3, XP007906067. Retrieved from the Internet: URL: http://web.archive.org/web/20070207051627/http://java.sun.com/j2se/1.5.0/docs/guide/javaws/developersguide/autodl.03.06.html> (Retrieved on Nov. 28, 2004).
Sun Microsystems, Inc., Java™ Network Launching Protocol & API Specfication (JSR-56) Version 1.5 [Online] May 2001, XP007906066. Retrieved from the Internet: URL: http://cds.sun.com/is-bin/INTERSHOP.enfinity/WFS/CDS-CDS_Developer-Site/en_US/-/USD/VerifyItem-Start/jnlp-1_5-mr-spec.pdf?BundledLineItemUUID=gvVIBe.pDpoAAAEdPR1iMS9Y&OrderID=0Q51Be.pB8IAAAEdMB1iMS9Y&ProductID=fL_ACUFB1v0AAAEY2U45AXuV&FileName=/jnlp-1_5-mr-spec.pdf> (Retrieved on Nov. 24, 2008), pp. 1-85.
Sun Microsystems, Inc., Packaging JNLP Applications in a Web Archive, Java™ Web Start 1.4.2 [Online] Aug. 2005, pp. 1-11, XP007906068. Retrieved from the Internet: URL:http://web.archive.org/web/20050828081147/http://java.sun.com/j2se/1.4.2/dosc/guide/jws/downloadservletguide.html> (Retrieved on Nov. 24, 2008).
Windley, Phillip J., "REST: Representational State Transfer," Chapter 11, Mar. 22, 2005, pp. 237-261.
In U.S. Appl. No. 11/089,699, Non-Final Office Action dated Dec. 15, 2008, to be published by United States Patent and Trademark Office, 8 pages.
In U.S. Appl. No. 11/089,699, Non-Final Office Action dated Jul. 9, 2009, to be published by United States Patent and Trademark Office, 10 pages.

\* cited by examiner

VERSION MANAGEMENT FOR APPLICATION EXECUTION ENVIRONMENT

CROSS-REFERENCE TO RELATED APPLICATIONS

This application is a continuation of and claims the benefit of priority from U.S. patent application Ser. No. 11/875,764, entitled VERSION MANAGEMENT FOR APPLICATION EXECUTION ENVIRONMENT, filed Oct. 19, 2007, and issued as U.S. Pat. No. 7,930,273 on Apr. 19, 2011, and this application claims the benefit of priority of U.S. Provisional Patent Application No. 60/952,816, entitled VERSION MANAGEMENT FOR APPLICATION EXECUTION ENVIRONMENT, filed Jul. 30, 2007; this application is related to U.S. patent application Ser. No. 11/875,756, entitled MANAGEMENT USER INTERFACE FOR APPLICATION EXECUTION ENVIRONMENT, filed on Oct. 19, 2007; this application is related to U.S. patent application Ser. No. 11/875,769, entitled APPLICATION TRACKING FOR APPLICATION EXECUTION ENVIRONMENT, filed Oct. 19, 2007, and published as U.S. Pub. No. 2009-0037835 on Feb. 5, 2009; and the disclosures of these applications are incorporated by reference in their entirety.

BACKGROUND

This specification relates to managing application execution environments (e.g., virtual machines and runtime environments), on a computer platform. A computer platform is a computer including a particular operating system (OS) for that computer (e.g., WINDOWS® OS, MAC® OS, or LINUX® OS). Software developers often create source code that can be appropriately compiled for respective computer platforms, and then independently generate native installation packages for each target platform. Each native installation package is associated with a specific computer platform, and these native installation packages can then be distributed for installation on appropriate machines. For a particular target platform, the appropriate native installation package is obtained from the software developer, and an OS installer can be used to process the native installation package in order to install the application. For example, INSTALLSHIELD® software can be used to produce an .msi file for installation on WINDOWS® machines, and a different software tool can be used to produce .pkg files for installation on MAC® machines.

Some software developers have created cross-platform installation packages, such as the JAVA® Archive (JAR) file format, that get deployed to the end-user system. The cross-platform package can then be expanded (e.g., decrypted and uncompressed) and written directly to disk using code provided by the software developer and/or the developer of the cross-platform package format. Typically, such cross-platform software relies on a previously installed virtual machine, such as the JAVA® Virtual Machine (JVM) (available from Sun Microsystems, Inc.), to run on the target platform.

The JVM provides a runtime environment and Java interpreter for most operating systems, including WINDOWS® OS, MAC® OS, AND LINUX® OS. Java source code files (files with a .java extension) are compiled into a format called bytecode (files with a .class extension), which can then be executed by a Java interpreter. Bytecode can be converted directly into machine language instructions by a just-in-time compiler (JIT). Other example runtime environments include the C runtime, .NET, and the Adobe® Integrated Runtime.

Flash® Player (available from Adobe Systems Incorporated) is another virtual machine, which is used to run, or parse, Flash® files including Shockwave Flash (SWF) compiled from ActionScript. The Flash® Player and Flash® Authoring software allow development of projectors (self-running SWF movies) that run on a specific target platform, by embedding the SWF data in the Flash® Player executable to create anew .exe file, and manipulating a byte pattern in the .exe file to indicate the presence of the SWF data. Such projectors can then be distributed for use on the target platform.

Traditionally, runtimes and their installers have been developed separately. Often, the installation engine for a runtime is acquired or licensed from a third party. An installer for a runtime contains its own user interface and other facilities for interacting with the OS of the target computer platform. When a new version of a runtime is produced, the older version is often uninstalled, and the newer version is installed in its place. In this case, applications that previously used the older version of the runtime should be able to use the newer version in order to operate properly. In the case of the JVM, two versions of the NM can be installed on a single computer, and these two JVM versions are then managed separately.

SUMMARY

This specification describes technologies relating to managing application execution environments (e.g., virtual machines and runtime environments), on a computer platform. In general, one or more aspects of the subject matter described in this specification can be embodied in one or more methods of managing an application execution environment, the one or more methods including: identifying which of multiple different versions of the application execution environment are installed on a computer; and managing the different versions of the application execution environment on the computer; wherein the identifying and the managing are performed using one or more of the different versions of the application execution environment. Other embodiments include corresponding systems, apparatus, and computer program products.

These and other embodiments can optionally include one or more of the following features. The application execution environment can include a cross-platform application program interface to provide services to applications that run in the application execution environment, and the managing can include managing the different versions of the application execution environment on the computer as a single runtime environment program having the different versions bundled therein. The method(s) can include binding each of the applications to one of the different versions of the application execution environment.

The binding can include: checking a namespace associated with one of the applications against the different versions of the application execution environment installed on the computer; installing a new version of the application execution environment on the computer when the namespace matches the new version, which is not already installed during the checking; and creating on the computer an executable for the one of the applications, the executable configured to load the version of the application execution environment that matches the namespace associated with the one of the applications. Each of the different versions of the application execution environment can be associated with a namespace that corresponds to a directory on the computer for the version, regardless of a patch level for each of the different versions of the application execution environment.

A system can include a user interface device and one or more computers operable to interact with the user interface device and to perform method operations. The one or more computers can include the computer having the different versions of the application execution environment installed thereon, and the computer can include the user interface device. The computer can include a personal computer running a web browser or a mobile telephone running a Wireless Application Protocol (WAP) browser.

Particular embodiments of the subject matter described in this specification can be implemented to realize one or more of the following advantages. A runtime environment can contain its own logic and user interfaces for use in managing different installed versions of the runtime environment. Version management code for the runtime environment can operate from within the runtime environment itself. Moreover, different versions of an application execution environment can be managed on a computer as a single runtime environment program having the different versions bundled therein. From an end user's perspective, the application execution environment can be seen as a single program (e.g., a single entry in an "Add or Remove Programs" control interface), and the different versions of the application execution environment can be treated as merely various components that plug in to the application execution environment. Any application that uses the application execution environment can be run without the user needing to know anything about which versions of the application execution environment are installed on the computer.

The application execution environment itself can handle identification and installation of different versions of the application execution environment. Associations between applications and different versions of the application execution environment in which the applications run can be managed without user input, including automatically downloading and installing any new versions as needed. In addition, a common user interface for managing the different versions of an application execution environment installed on a computer can be provided for use by more sophisticated users (e.g., computer system administrators). This user interface can allow a user to manage both the set of versions installed on the computer, and the details of how a particular version of the application execution environment is configured.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
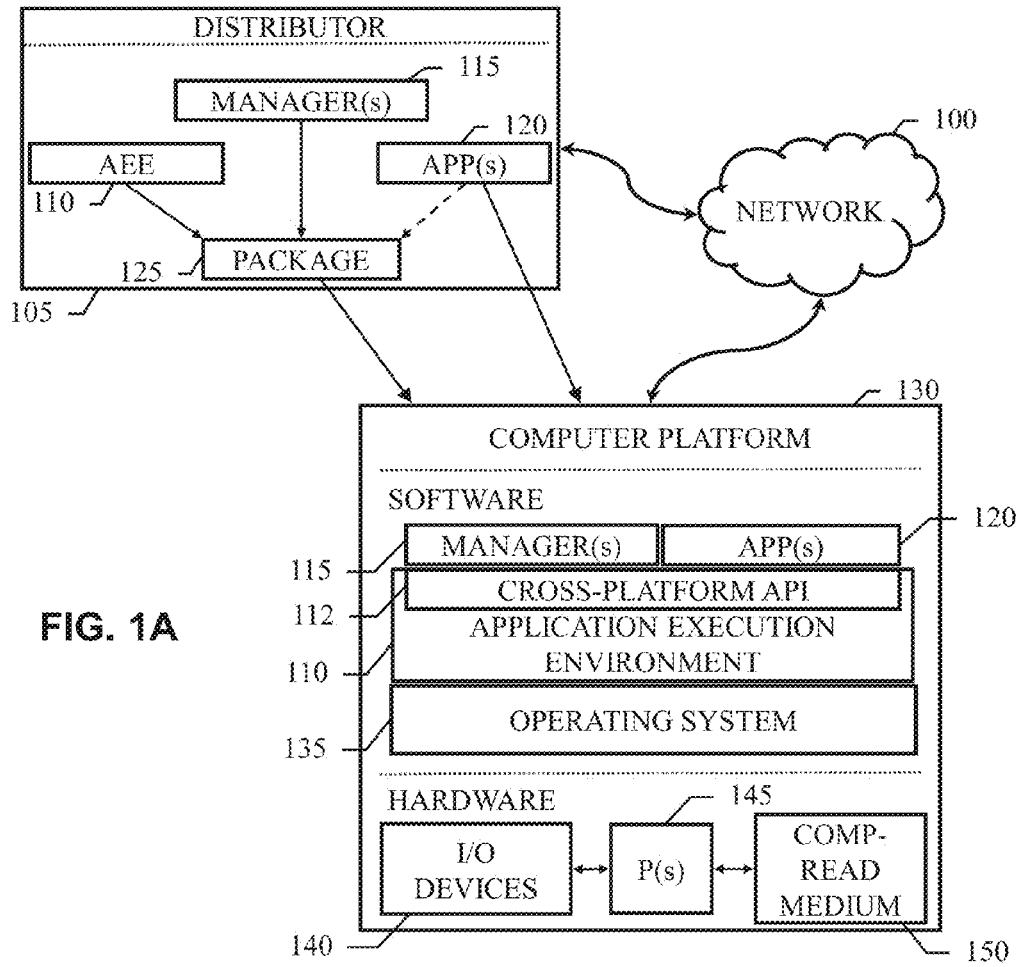
FIG. 1A shows an example system for software distribution, installation and management.

FIG. 1A shows an example system for software distribution, installation and management. A distributor 105 can provide an application execution environment (AEE) program 110, one or more AEE manager programs 115 (e.g., one or more installers and version management console programs), and one or more software applications 120 to be installed on a target computer 130. The distributor 105 makes an installer package 125 available for use installing one or more software programs on the computer 130. The installer package 125 can be a digitally signed document, where the signature is validated before the installer package 125 is used further. The installer package 125 can include an AEE installer and the AEE program. In addition, the installer package 125 can include one or more applications 120, or references to such, for installation along with the application execution environment program 110.

The distributor 105 can be a software developer, publisher, reseller, or other entity which distributes software, or the computers used by such. For example, the distributor 105 can be a server or server cluster providing software download facilities over a network 100, such as Local Area Networks, peer to peer networks, wireless networks, the Internet and the World Wide Web. The application execution environment program 110 and applications 120 can be distributed separately by multiple parties. The installer package 125 can also be distributed on physical media, such as Compact Discs (CDs), Digital Versatile Discs (DVDs) and floppy disks, or by other techniques that can be used to deliver digital content.

The target computer 130 includes both hardware and software. The hardware includes input/output devices 140, one or more processors 145 and at least one computer is readable medium 150 (e.g., memory device(s), a storage device(s), or combinations of one or more of them). The software can include an operating system 135 on which the software elements provided by the distributor 105 operate. The application execution environment 110 can use the operating system 135 to interact with other elements of the computer 130. The application execution environment 110 can provide various utility services for use by applications that run in the application execution environment. These utility services can include file system access, window and menuing, integration with the OS shell (e.g., WINDOWS® OS Explorer or MAC® OS Finder), file extension registration, document processing support (e.g., Hypertext Markup Language (HTML) and Portable Document Format (PDF) engines), string manipulation, graphics, networking, notification facilities, addressing peripherals, or other types of functionality that can be provided using a runtime library. Moreover, the application execution environment 110 can include a cross-platform application program interface (API) 112 that provides services to applications that run in the application execution environment and serves to abstract away details of the various hardware and OS platforms on which the application execution environment program 110 has been designed to run.

Thus, the application execution environment (ABB) 110 can be a cross-platform runtime environment, such as the Adobe® Integrated Runtime (AIR™) software, provided by Adobe Systems Inc. of San Jose, Calif. In some implementations, the application execution environment 110 can load an application from an encoded representation of the application. For example, the encoded representation can have a predefined syntactic structure such as a programming language (e.g., source code) or can include well defined virtual instructions (e.g., platform-independent bytecode, such as Macromedia Flash® bytecode). To load such applications, the application execution environment 110 can decode the encoded representation of the application into instructions and can execute the instructions of the application.

In addition to serving as an application execution environment, the AEE 110 can also serve as an application installation environment, both for itself and the applications 120 that run on the AEE 110, and as aversion management environment for itself. The user interface and language facilities of the AEE 110 (e.g., HTML, MXML (Multimedia eXtensible Markup Language), and scripting support, such as for ActionScript and JavaScript) can be used when writing a management console program 115 for the AEE 110.

The extent of the install/uninstall facilities to be put into the AEE 110 can vary among implementations. In some cases, the AEE 110 can provide APIs that perform all installation operations, based on requests from one or more appropriate installers. In other cases, some installation operations can be provided in the one or more installers/managers, and lower level API's of the runtime (e.g., file system access API) can be used to complete the installation operations on the computer 130. In any event, a version management console program can employ the install/uninstall facilities of the AEF, to manage which versions of the ALL are installed and registered on a computer, either automatically during an installation of the AEE (e.g., when a new version of the AEE is installed), or upon user request (e.g., when the user selects a management option presented for the AEE in a control panel for installed programs).

Figure 2A:
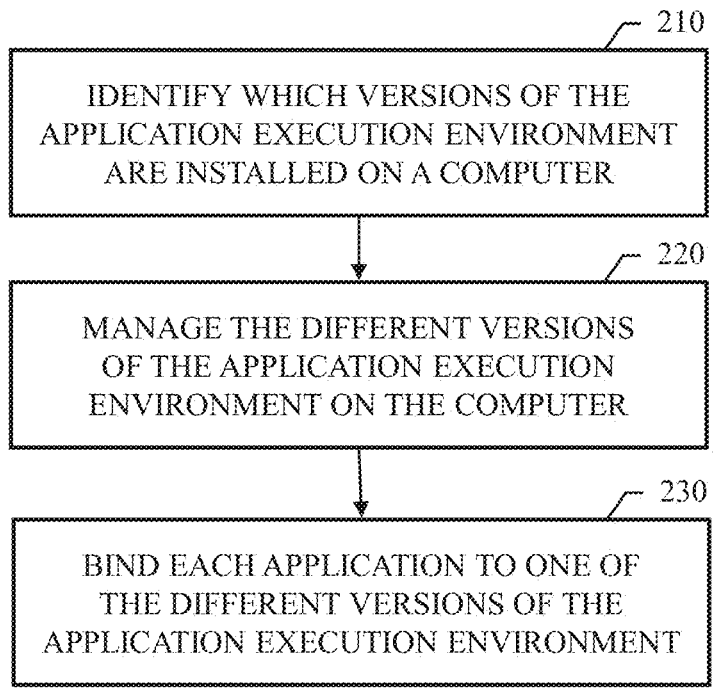
FIG. 2A shows an example process of version management for an application execution environment.

FIG. 2A shows an example process of version management for an application execution environment (ALL). Which of multiple versions of the AEE are installed on a computer can be identified 210. First the main location of the AEE can be found. For example, on some systems (e.g., a WINDOWS® OS computer) when the AEE is installed, information can be recorded in the registry that maps a unique identifier associated with the AEE to the install location. This unique identifier can also be included in the AEE management code such that the identifier can be looked up in the registry to get back the install location. On other systems (e.g., a MAC® OS computer), a list of predefined, valid AEE install locations can be searched to find the actual install location.

With the AEE location in hand, the different versions of the AEE can be found. For example, the installed AEE can include a directory named "versions", which includes a set of sub-directories named according to the AEE version they contain. Note that patch levels for specific versions can be recorded separately and need not have any correspondence to aversions directory structure within the installed AEE.

The different versions of the AEE can be managed 220 on the computer. This can involve uninstalling particular versions of the AEE, applying one or more patches to update installed versions of the AEE, adding components to, or turning on/off features of installed versions of the AEE (e.g., adding a program framework that runs on top of one or more of the different AEE versions), and installing one or more new versions of the AEE.

The identifying 210 and the managing 220 can be performed using one of the different versions of the application execution environment. Thus, the version management console program (which can be included as part of an installer for the AEE) can run in the AEE itself and utilize the install/uninstall facilities built into the AEE. Moreover, when a new version of the AEE is to be added (or an update is to be applied), an installer package can be provided that includes the new version of (or update to) the AEE and an installer for that AEE (or update) that runs in the AEE.

The new AEE version includes appropriate native, platform-specific code for the target computer platform (e.g., for a computer running WINDOWS® OS, MAC® OS, or LINUX® OS). This new AEE program can be combined with an installer for this new AEE program (and for an application, if such is being installed at the same time) into an installer package. Note that this combining can be specific to a class of computers; thus, the identifying and the combining can be performed for each target class of computers to prepare an installer package for each target class, which can be provided separately to each target computer that is a member of the class. Alternatively, the identifying and the combining can be performed dynamically for each target computer, such as when the installer sent needs to be specific to the target computer for digital rights management (DRM) purposes.

In addition, each application 120 can be bound 230 to one of the different versions of the application execution environment. This binding can ensure that whenever an application 120 is invoked, it will run on the version of the AEE against which that application was tested. Thus, multiple applications 120 and multiple different versions of the AEE 110 can be installed on a given computer, and each of the applications 120 (or a proper subset thereof) can be bound to a different version of the AEE 110. Although, from the user's perspective, all of the applications 120 can be presented as running on the same AEE 110, and the distinctions between different versions of the AEE 110 can remain completely transparent to the user during normal operation.

Figure 2B:
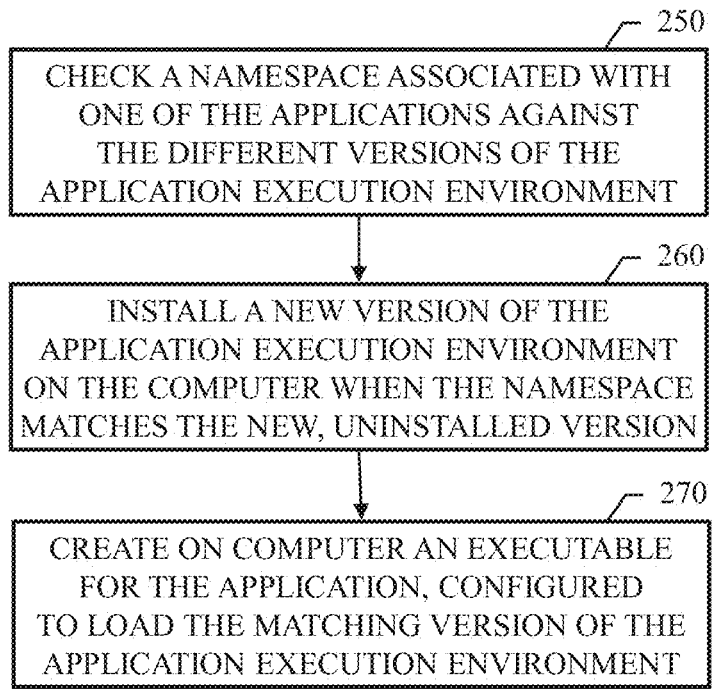
FIG. 2B shows an example process of binding an application to a version of an application execution environment.

FIG. 2B shows an example process of binding an application to aversion of an application execution environment. A namespace associated with one of the applications can be checked 250 against the different versions of the AEE installed on the computer. This can involve checking a manifest associated with the application. For example, the applications 120 can be distributed in a format that includes a document (e.g., "application.xml") placed in a pre-determined location (e.g., at a certain location within a compressed archive file for each application), where this document specifies the namespace for the application and for the XML elements within the document. This document can also include information (or references to such information) used when installing the application, such as an application name, an application icon, a version number for the application, and code for the application.

Figure 2C:
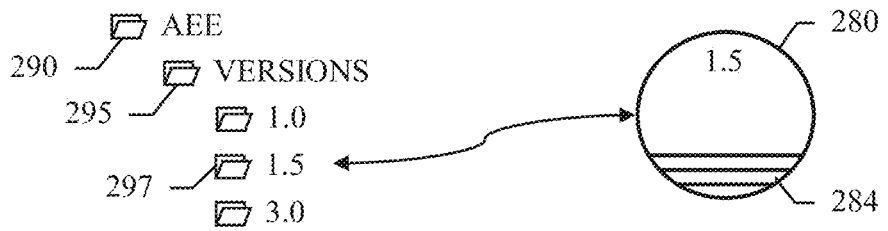
FIG. 2C shows an example of a namespace that corresponds to a directory on a computer.

FIG. 2C shows an example of a namespace 280 that corresponds to a directory 297 on a computer. In this example, a parent directory 290 includes documents for the AEE and also a sub-directory 295 called "versions". Within the versions directory 295 are multiple sub-directories corresponding to different installed versions of the AEE (e.g., version 1.0, version 1.5, and version 3.0). Thus, in this example, the namespace 280 includes all AEE programs that fall into version 1.5, regardless of a patch level 284 that has been applied to version 1.5 on a given computer. Note that multiple patches can be created for each version of the AEE, and thus, the same version of the AEE need not be identical on different computers due to different patch levels having been applied. In any case, the namespace can be mapped to an installed version of the AEE or be used to construct a query, e.g., a Universal Resource Locator (URL) that encodes the query without using query parameters (the portion following the question mark in a URL), to send to a server to get information relating to that version (e.g., an installer for that version).

Referring again to FIG. 2B, a new version of the application execution environment can be installed 260 on the computer when the namespace associated with an application matches the new version, which is not already installed at the time of the checking 250. For example, when a new application is to be installed, the AEE 110 can check to see whether the new application uses a new version of the AEE 110 that has not yet been installed on the local computer. If so, the AEE 110 can automatically retrieve the new version of the AEE 110 (e.g., from a server over the Internet) for installation along with the application.

In addition, the installation of the new version can employ an installer package that combines the new AEE version with the installer for this new AEE version. The installer itself can run in the AEE, and the installer package can be provided to the target computer to install the new AEE version (and also potentially the application that relies on that version of the AEE) by running the installer in the application execution environment copied to the target computer.

Figure 1B:
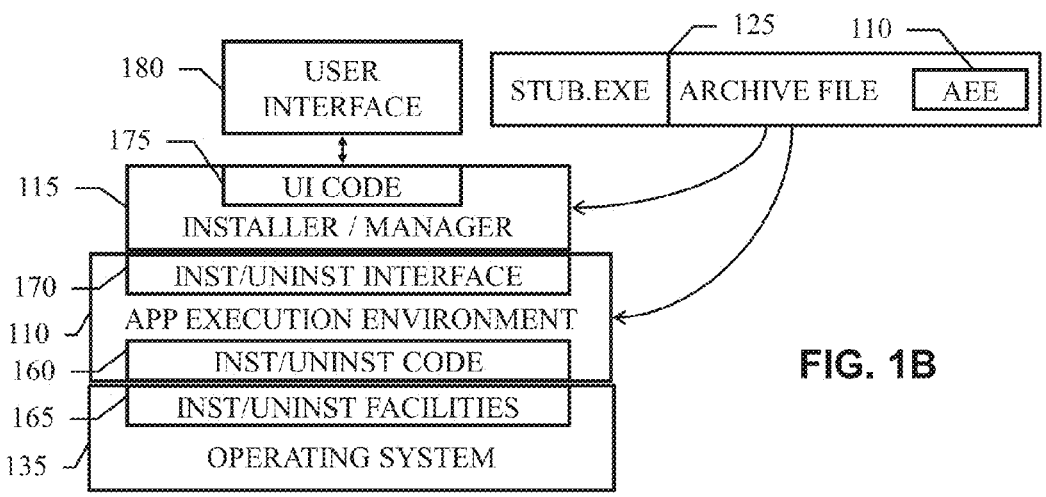
FIG. 1B shows example elements that can be used to install an application execution environment.

FIG. 1B shows example elements that can be used to install an application execution environment. As shown in FIGS. 1A & 1B, the installer 115 runs on top of the application execution environment 110 in a manner similar to application (s) 120 designed to run in the application execution 110. The installer package 125 can include a compressed archive file (e.g., a Zip file) into which a single copy of the new AEE version has been packaged. In addition, this compressed archive file can be added to a self-extracting executable stub (stub.exe) to form the installer package 125 (e.g., for use with WINDOWS® OS based computers). Upon execution, the self-extractor code in the executable stub can unarchive the AEE to a temporary location. The AEE has been designed so that it can be run in place, i.e., without requiring an installation step other than simply copying files.

Thus, the extracted copy of the AEE is immediately useable for running the installer. The installer package 125 can be transmitted to the computer to cause the computer to perform install operations when the installer package is invoked (e.g., when the installer package executable is executed). The new version of the AEE program can be copied to the computer, which can involve extracting the AEE program version to the target computer from a compressed archive file, after which, the new version of the AEE is useable for running the installer. The new version of the AEE program can be launched on the target computer in x-copy mode. The installer can be run in the launched, new version of the AEE on the target computer before the new AEE program version has been installed on the target computer (i.e., it is running x-copy mode). The installer can present a user interface (UI), including various UI panels, to the user and can make a second copy of the new NEE program version (directly from the running copy) to its final install location.

Thus, a first version of the AEE can be used to identify which of the multiple versions of the AEE have been installed on the computer, and a second version of the AEE can be used to install the second version of the AEE itself. For example, version 1.0 of the AEE can be installed on the computer when a new application is going to be installed. AEE version 1.0 can identify the installed versions of the AEE to determine whether a new version (e.g., version 2.0) of the AEE is needed for the new application. If so, a first copy of the AEE version 2.0 can be made at a first location on the computer. This can be an executable copy of the AEE program version 2.0 that has been downloaded to a temporary directory, where it can be run before the installation has been completed. Execution of the first copy of the application execution environment program can be initiated, and a second copy of the AEE program version 2.0 can be made at a second location on the computer. The version 2.0 of the AEE program can be registered at the second location on the computer. This can involve registering file extensions and MIME (Multipurpose Internet Mail Extensions) content types and registering instructions for an AEE manager program. Note that only the most recent version of the NEE need be registered for the common file extension(s) employed by the AEE, since the most recent version of the AEE can invoke older installed version as needed for a particular situation (e.g., when applying a patch to the older version). The first copy of the AEE program version 2.0 can be deleted at the first location on the computer. Note that making the second copy and deleting the first copy can be part of a move operation that has been integrated with the installation process. In addition, the copying, registering and deleting can involve using logic built into the AEE program.

In the example described in connection with FIG. 1B, the installer package 125 can itself be considered an installer, since the package 125 is an executable that begins the installation process. In other situations, the installer package 125 can be a compressed archive file itself. For example, for MAC® OS computers, the installer package 125 can be a ".dmg" file in disk image format. In this case, the user can open the .dmg file (e.g., double click it) and then launch the AEE installer included therein. Moreover, the installer package 125 can include one or more additional installers, as discussed further below.

In any event, the application execution environment program 110 can include installation/uninstallation code 160 for installing and uninstalling software to the target computer 130 and for performing updates, such as applying patches (e.g., to address discovered security vulnerabilities) or adding components or features to the different AEE versions. The cross-platform application program interface 112 can be operating system independent and can include an install/uninstall interface 170 to the installation/uninstallation code 160. The installer 115 can include user interface code 175. When the installer 115 is run in the AEE 110 on the target computer, the installer 115 can employ the install interface 170 of the AEE 110 to effect installation of the new AEE version, and the installer 115 can employ the user interface code 175 (e.g., HyperText Markup Language, ActionScript or SWF code), which can also be run using the AEE 110, to generate and present a user interface 180 for the installation process.

For example, the installer 115 can contain a user interface that has been written using Adobe® Flex™ software, Flash® code or ActionScript code (or a combination of these), where this user interface (UI) communicates with logic that is embedded in the AEE 110. The name of the main class in the AEE 110 (for this purpose) can be "runtime installer", and an instance of the runtime installer can be created, some properties can be set on this instance, and then the runtime installer can be started. The runtime installer can then dispatch events, as the install proceeds, to report on progress (e.g., progress of download, what percentage has been installed, if something has gone wrong, and so forth). These events can be captured by the code in the installer 115, which causes the UI to be updated. Note that communications going in both directions can be implemented using events. Thus, when the user accepts an end user license agreement for the AEE 110, an event can be sent from the UI to the runtime installer class, telling it to proceed with the installation. Then, progress events can come back the other way and cause a progress bar to be updated.

When the installer 115 is run in the AEE 110 on the target computer, the installer 115 can also cause placement of an AEE manager program on the target computer, where the AEE manager program can also run in the ALE 110. The AEE manager program can be another copy of the AEE 110 plus code that runs on top of it (e.g., Flex™ code). Thus, the installer can employ the interface 170 to effect installation of the new version of the AEE 110, and the AEE manager program can employ the interface 170 to effect uninstallation of the new version of the AEE 110, to effect installation of other versions of the AEE 110, or to apply updates to installed versions of the AEE 110. Furthermore, the installation/uninstallation code 160 in the AEE 110 can be designed to operate directly on the target computer to perform install and uninstall tasks (e.g., in a MAC® OS based computer), or the installation/uninstallation code 160 can be designed to interface with install/uninstall facilities 165 provided by the OS 135 (e.g., the WINDOWS® installer APIs in a WINDOWS® OS based computer).

In the example presented above, the runtime installer class can have very different implementations on a MAC® OS based computer versus a WINDOWS® OS based computer. On a WINDOWS® OS based computer, the runtime installer can operate using API(s) that are in the AEE 110 and that are related only to installation because they use the WINDOWS® installation services to perform the installation operations. On a MAC® OS based computer or a LINUX® OS based computer, the runtime installer can operate using the file system API(s) that are in the AEE 110. In any event, the runtime installer class can define a cross-platform interface that the installer/manager 115 can access and use in the same manner, regardless of whether it is running on a MAC® OS based computer or a WINDOWS® OS based computer (i.e., the installer/manager 115 need not have any native code in it). Other approaches are also possible. For example, the AEE 110 can provide a mechanism for invoking native code, and this mechanism can also be used by the installer/manager 115.

Referring again to FIG. 2B, an executable for one of the applications 120 can be created 270 on the computer. The executable can be configured to load the version of the AEE that matches the namespace associated with that application. For example, a template executable can be converted to an application specific executable. The template executable is a generic native application executable (e.g., for a WINDOWS® OS or a MAC® OS computer), which can be included in the installation package 125, the AEE 110, or both, and can be converted to the application specific executable during installation on a particular computer. Alternatively, the conversion can occur earlier, and the application specific executable can be included in the installation package 125.

In either case, application information can be supplied with the installation package, or by other means, and combined with information from the platform-specific template executable to generate the application specific executable. The application information includes information specific to the application, such as code implementing algorithms, data, or documentation. The template executable is specific to the target computer platform and contains machine code common to executables of that platform.

The template can be copied and renamed according to information included in the application information. The template can include generic filler material, such as a generic icon, that is overwritten when creating the application executable. The template executable can include other resources such as common code that can be used for performing common tasks or links to system libraries such as Dynamic Link Libraries (DLLs). These can include one or more references to DLLs of the new version of the AEE (e.g., a version specific path within a directory structure), thus creating the binding between a given application and that version of the AEE. In addition to this AEE version information, the template executable can also include a version resource to which version information about the application can be added when generating the application executable.

The application information can include an application name, which is used as the name for the application executable. An application icon can be included in the application information and can be integrated with the template executable when generating the application executable. For example, the application icon can be an application specific graphic in Portable Network Graphics (PNG) format that overwrites the generic icon, e.g., after conversion to Windows® Icon format (ICO), to form the application icon in the application executable. This application icon is then used to start the application, such as by presenting the icon in the OS user interface for double clicking by a user. A version number can also be provided with the application information for further identification of the application executable, and the version resource in the copied template executable can be updated with the version number to form the version number in the application executable. Additionally, the application information can include code, which can be cross-platform code, such as SWF and HyperText Markup Language (HTML), platform-specific code, such as machine code native to the target platform, or a combination of these. The code can be in source, compiled (fully compiled or partially compiled) and/or interpreted form and can be inserted into the application executable as code. For example, an SWF file that provides the logic and user interface for a new application can be embedded as a resource in the executable. A "resource", in this context, is a section of an executable file reserved for storing data of various types. Typically, an OS provides a programming interface, which can be used to manipulate the resources programmatically, and embedding SWF code as a resource can be done using an OS programming interface or by modifying the executable image directly (note that the specification for the executable format for any given platform describes how to structure the executable file to include these resources). Moreover, the application information can include additional files, including both data and code, such as Portable Document Format (PDF) tiles and JavaScript files.

Thus, a copy of the template executable can be made, and this copy becomes the is application executable. Some items present in the template executable are replaced in the application executable with items used in whole or in part from the application information provided. Some information or resources may need to be converted prior to use for populating the application executable. Some platforms may require icons to be converted to a particular graphics format different from that provided with the application information (e.g., conversion from .png to .ico format). In some instances, the application name provided with the application information (or the install directory location) can be changed to follow the conventions of the target platform; in such cases, the application name (and application executable location) can be converted to a suitable equivalent. In any event, the resulting application executable is generated from the template, can run as native software on the target platform, and includes new functionality added to the executable without recompiling the executable from source code. This resulting application executable also includes reference(s) to a particular version of the AEE, thereby creating the binding between that application and that version of the AEE.

Figure 3A:
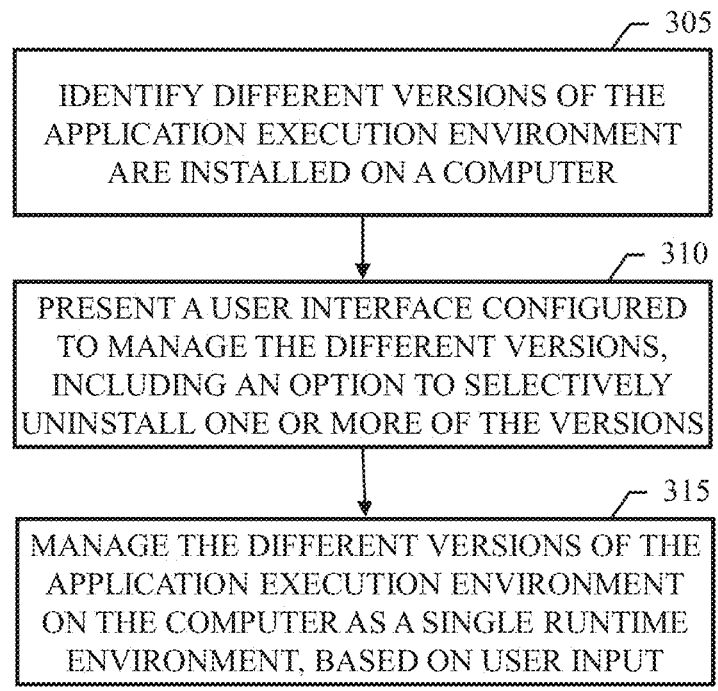
FIG. 3A shows another example process of version management for an application execution environment.

As will be appreciated from the above description, the different versions of the AEE can be managed on the computer as a single runtime environment program having the different versions bundled therein. FIG. 3A shows another example process of version management for an application execution environment. This process can be effected using an underlying application execution environment on which the management program runs, or this process can be effected using a separate management program that does not rely on any version of the application execution environment to run on the computer for which the different versions are to be managed. In either case, the management program can be triggered by a user invoking the management program, such as by selecting a manage/change option presented for the application execution environment in an "Add or Remove Programs" control interface presented on a WINDOWS® OS computer, or such as by starting a management program provided by the application execution environment on a MAC® OS computer (and placed in a directory where the management program will be found by the MAC® OS Finder). In addition, an uninstall facility can be provided for the AEE overall, such that the user can quickly uninstall all installed versions of the AEE, such as by selecting an uninstall option presented for the application execution environment in an "Add or Remove Programs" control interface presented on a WINDOWS® OS computer.

When the version management program is triggered, the different versions of the application execution environment installed on the computer can be identified 305, such as described above. Note that the different AEE versions can be installed, updated and uninstalled individually and independently, and in any order. Each AEE version can be clearly demarcated from the rest, which can include storing code specific to each version in a version specific directory, as discussed above in connection with FIG. 2C. In addition, each application can be bound to a single version of the AEE, as discussed above, such that the specified AEE version is required for that application to run; each application can declare exactly which version of the AEE is required for that application.

A user interface can be presented 310 to allow user management of the different versions of the application execution environment. The user interface can include multiple different interface panels including at least one panel that shows all the versions of the AEE currently installed on the computer and including an option to selectively uninstall one or more of the different versions of the AEE.

The different versions of the AEE can be managed 315 on the computer as a single runtime environment program having the different versions bundled therein, based on input received via the user interface. It should be noted here, that the present use of the term "versions" differs from traditional usage in that a different version of the AEE bundled into the AEE need not be a true stand alone piece of AEE software. Each different version of the AEE, when bundled into a single runtime environment program, can be a different version of the cross-platform API, and each application can be bound to a specific version of the different cross-platform APIs included in the single runtime environment program. In addition, management of the AEE versions can include uninstalling one or more versions of the AEE (e.g., one or more versions of the AEE APIs), applying update(s) to one or more versions of the AEE (e.g., one or more versions of the AEE APIs), and installing one or more new versions of the AEE (e.g., one or more versions of the AEE APIs).

Figure 3B:
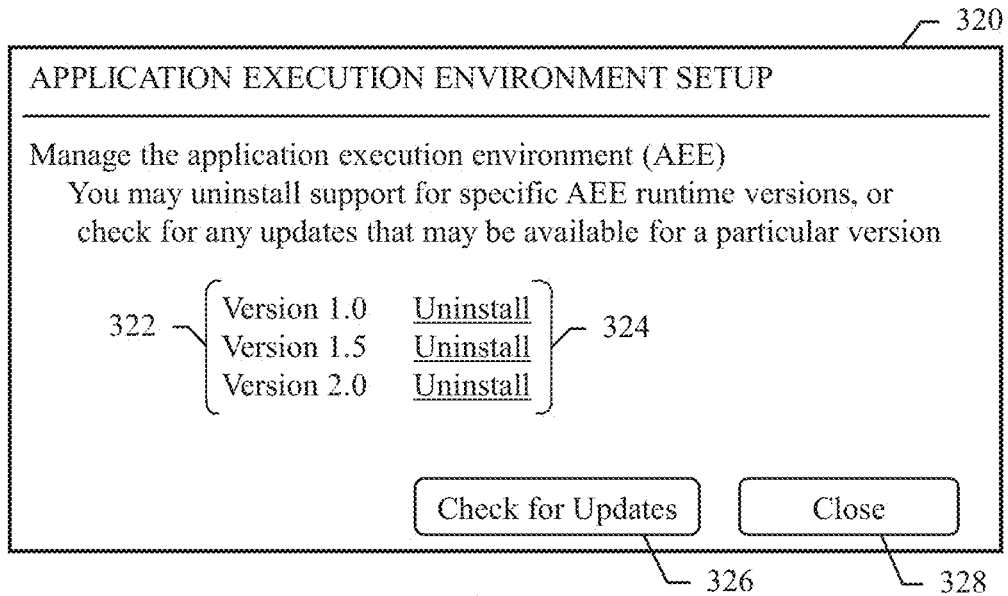
FIG. 3B shows an example user interface panel that can be used to uninstall one or more versions of an application execution environment.

FIG. 3B shows an example user interface panel 320 that can be used to uninstall one or more versions of the application execution environment. The user interface (UI) panel 320 includes information regarding the functionality made available through the interface: "APPLICATION EXECUTION ENVIRONMENT SETUP: Manage the application execution environment (AEE); You may uninstall support for specific AEE runtime versions, or check for any updates that may be available for a particular version." The UI panel 320 also includes a listing 322 of all the different versions of the AEE currently installed on the computer (e.g., versions 1.0, 1.5, and 2.0) and selection controls 324 (e.g., a hyperlink style control for each installed version, labeled "Uninstall") for use in uninstalling selected versions of the AEE. It will be appreciated that many other interface controls can be used to provide the option to uninstall one or more of the different versions of the AEE. For example, a check box control can be provided for each AEE version, along with an uninstall button control, such that the user can check off the versions to be uninstalled, and initiate the uninstallation by selecting the uninstall button.

The UI panel 320 also includes a "Check for Updates" button control 326 and a "Close" button control 328. When a user selects the "Close" button control 328, the management UI is closed. When a user selects the "Check for Updates" button control 326, a check for any patches to installed versions of the AEE, and for new versions of the AEE, can be started. This can involve communicating with a server over a network (e.g., the Internet) to discover any available updates to the AEE.

Figure 3C:
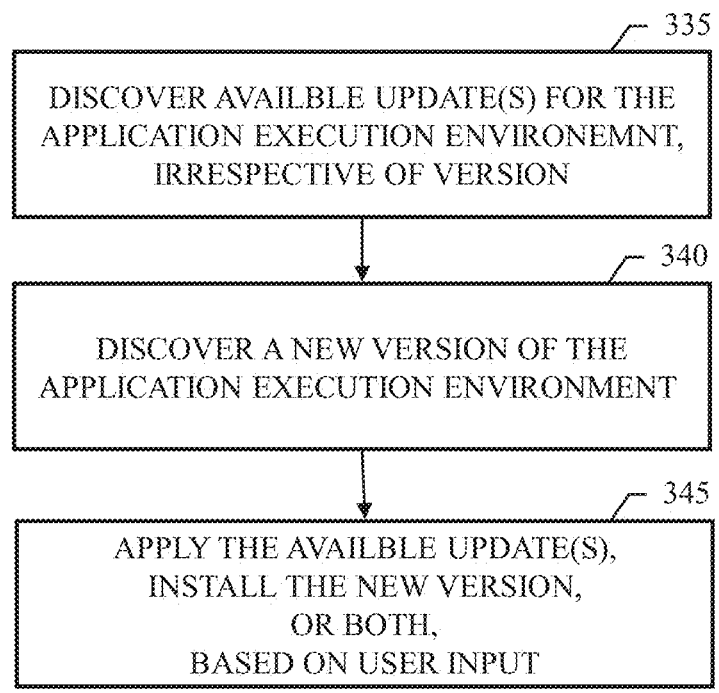
FIG. 3C shows an example process of updating versions of an application execution environment.

FIG. 3C shows an example process of updating versions of an application execution environment. Any available updates for the AEE can be discovered 335, irrespective of version. Thus, an update that is applicable to an earlier one of the different versions of the AEE, but not applicable to a later one of the different versions of the AEE, can be found. For example, a security problem may be found for an older version of the AEE, where that same security problem is not present in the newer version of the AEE. In this case, a security patch can be made available over a network (e.g., the Internet) for download and application to any installed copies of the older version that have the security problem.

Figure 3D:
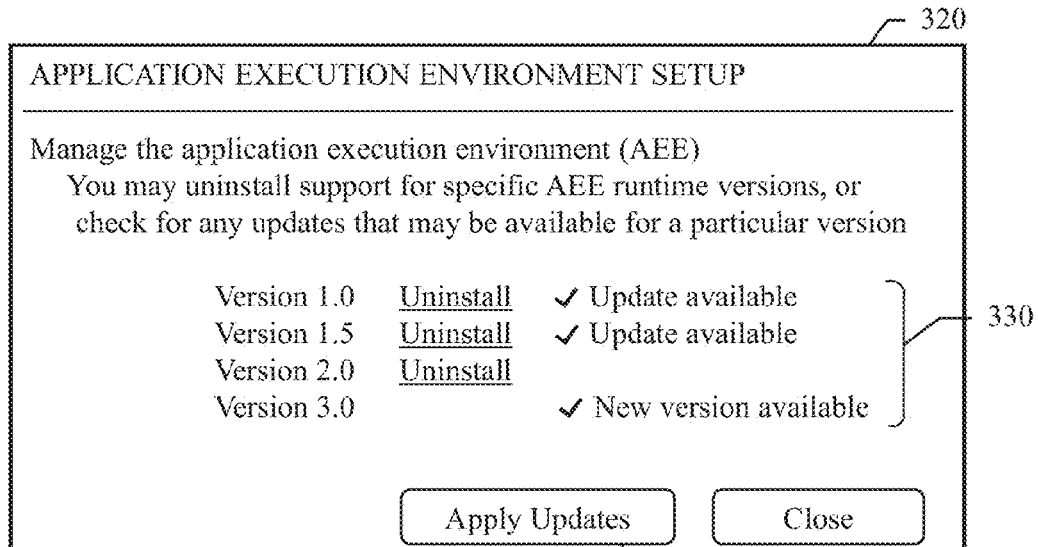
FIGS. 3D and 3E show example user interface panels that can be used to uninstall, install and apply updates to different versions of an application execution environment.

Furthermore, any new versions of the AEE can also be discovered 340, such as through the same communication with the server over the network. Then, any available updates can be applied 345, and/or any new versions found can be installed 345, based on user input. Note that the discovery and application of any available updates can each be done automatically, or in response to user input. For example, when a user selects the "Check for Updates" button control 326 in the UI panel 320 shown in FIG. 3B, this can cause the AEE management program to discover any available updates, including both patches to existing is installed versions of the AEE and new versions of the AEE. The UI panel 320 can then be updated as shown in FIG. 3D.

A listing of the available updates 330 (including patches to installed versions 1.0 and 1.5, and a new version 3.0) is now included in the UI panel 320. In addition, an "Apply Updates" button control 332 has been included in the UI panel 320. In this example, the user can initiate application of the patches and installation of the new version through a single selection of the "Apply Updates" button control 332. Thus, the mechanism used to obtain input authorizing updates to different versions of the AEE (e.g., applying security patches and adding new components or features) and installation of new version(s) of the AEE can be integrated into one place. With a single click, the user can initiate all available updates to the AEE. As before, check box controls can also be provided, allowing a user to unselect the updates that they do not want to apply when selecting the "Apply Updates" button control 332. Notifications regarding any end user license agreements (e.g., for a new AEE version to be installed) or documentation concerning the updates to be applied (e.g., a ReadMe file for a security patch) can also be retrieved and presented through the user interface.

Figure 3E:
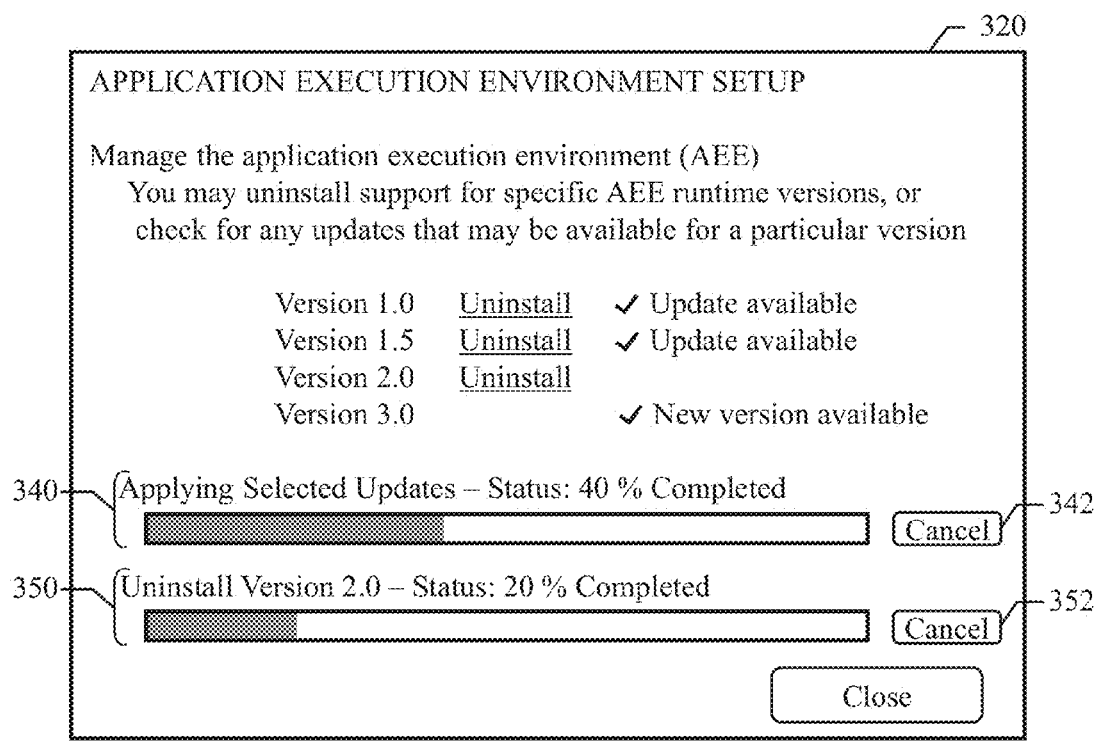

In addition to presenting a user interface configured to manage installation, update and uninstallation of the different versions of the AEE, the progress of multiple AEE management tasks can be separately shown within the user interface. In FIG. 3E, a user has already selected the "Apply Updates" button control 332, and the user has then selected the Uninstall option for version 2.0 of the AEE. Progress information 340 ("Applying Selected Updates—Status: 40% Completed" and a progress bar) and a corresponding cancel button control 342 are thus shown in the updated UI panel 320. In addition, progress information 350 ("Uninstall Version 2.0—Status: 20% Completed" and a progress bar) and a corresponding cancel button control 352 are also shown in the updated UI panel 320. Thus, multiple management tasks can be initiated from the AEE management UI, and processed in parallel, and the progress of these management task can be shown in-line in the UI.

When the management task includes applying update(s) to installed version of the AEE, a check can first be made to see whether any applications that rely on the AEE, version(s) to be updated are currently running, and if so a user can be alerted to this fact and asked to close those application(s) before initiating the update. This can avoid requiring a reboot of the computer. The check for running applications can be performed using an interapplication communication (IAC) mechanism, such as LocalConnection (which operates using a shared memory segment) or another !RC mechanism. In addition, the same check for dependent running applications can be performed before uninstalling any AEE versions.

Figure 4A:
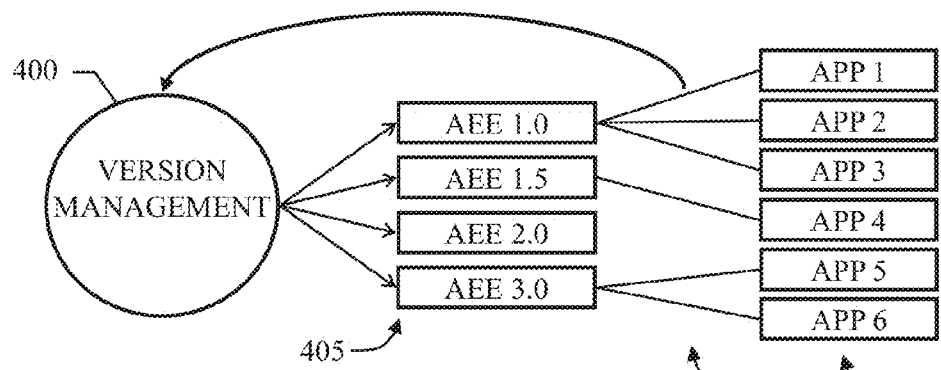
FIG. 4A shows associations maintained between applications and different versions of an application execution environment, and management of the different versions based on those associations.

Management of the AEE versions can be based, in part, on dependencies between the AEE versions and the applications installed on the computer. FIG. 4A shows associations 410 maintained between applications 415 and different versions 405 of an application execution environment, and management 400 of the different versions based on the associations 410. The associations 410 indicate in which of the different versions 405 of the application execution environment the applications 415 run. The associations can be created and maintained in various manners, including using alternative approaches with different operating systems. For example, on a MAC® OS computer, the associations 410 can be maintained using file extension registrations, such as described below in connection with FIG. 4B, whereas on a WINDOWS® OS computer, the associations 410 can be maintained using existing component reference counting facilities available through WINDOWS® installation services. Moreover, the associations 410 can be unidirectional (e.g., pointing from application to AEE version) or bidirectional.

The version management 400 takes into consideration the associations 410 during one or more management tasks. For example, a user can be alerted when an AEE version selected for uninstall has dependent applications still installed on the computer, in which case, the user may not wish to uninstall that version after all. Thus, as shown in FIG. 4A, if a user were to select uninstall for AEE version 2.0, no alert need be generated since none of the currently installed applications 415 rely on AEE version 2.0. But if a user were to select uninstall for NEE version 1.5, an alert can be generated to let the user know that APP 4 still depends on AEE version 1.5. The alert can enumerate the applications dependent on the AEE version, or simply note that there is at least one dependent application. The alert can include user interface control(s) that allow the user to confirm or cancel the uninstall, and to decide whether to uninstall APP 4 at the same time that NEE version 1.5 is uninstalled. Other management tasks can also employ the associations 410.

Figure 4B:
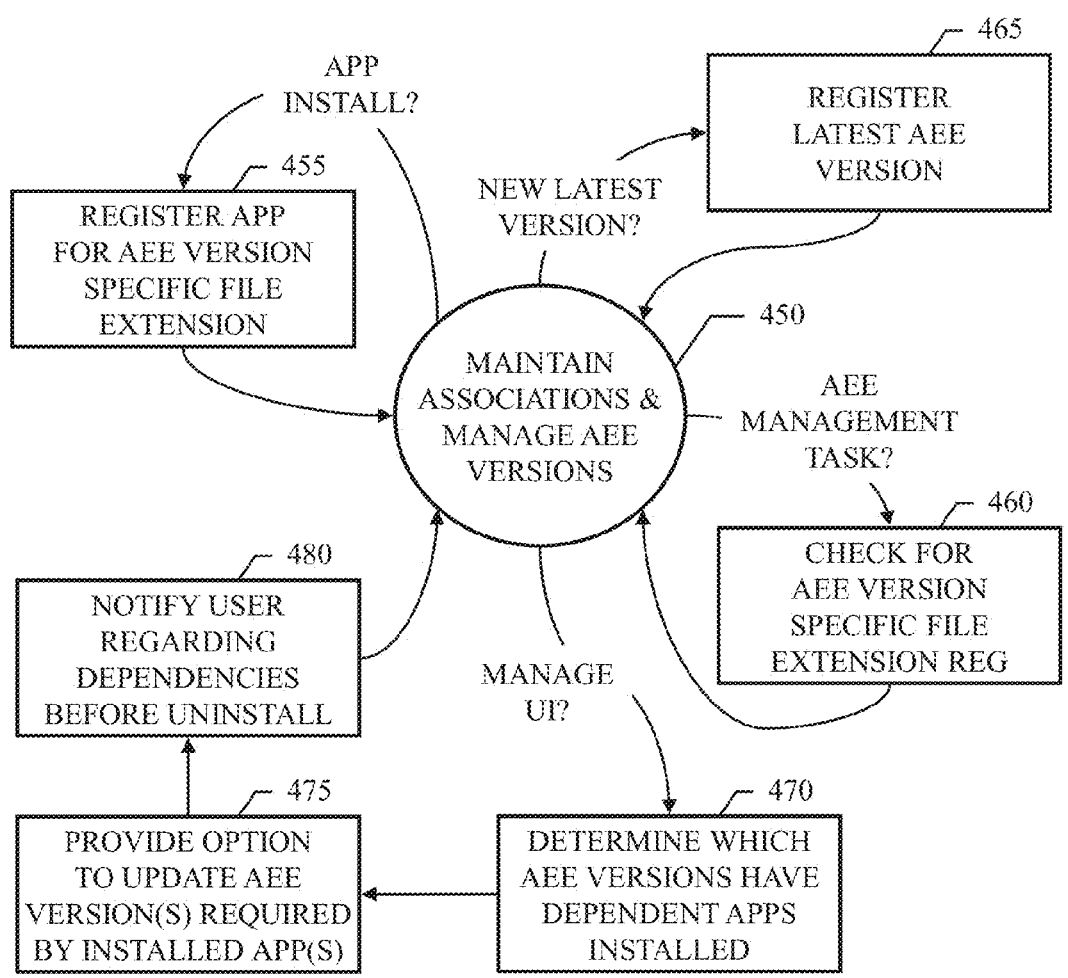
FIG. 4B shows example processes of maintaining associations and managing different versions of an application execution environment based on those associations.

FIG. 4B shows example processes of maintaining associations and managing different versions of an application execution environment based on those associations. In general, a maintenance and management state 450 can be entered whenever an AEE management program is initiated, which can occur automatically when one of the different versions of the AEE is invoked (e.g., when one of the applications is started by a user) or when a user opens the management console. Different management tasks can then result in different operations in the maintenance and management state 450, where these operations can include one or more maintenance operations, management operations, or both.

When a new application is to be installed, the associations can be maintained by registering 455 the application for a file extension on the computer that is specific to one of the different versions of the application execution environment. This file extension can be a fake file extension (e.g., ".AEE-1-5") whose only purpose is to support application tracking (and won't interfere with other applications). For example, on a MAC® OS computer, the application can claim to support this fake file extension. Thus, when the MAC® OS inspects the application, it will identify the supported fake file extension and record this information in its launch services database. This file extension registration can then be used to identify whether applications that rely on a given version of the application execution environment (e.g., applications dependent on AEE version 1.5) are installed on a computer with an operating system that doesn't include a built in facility for component reference counting, such as a MAC® OS computer.

The file extensions used for application tracking can be per-machine or per-user, based on whether the application is installed per-machine or per-user. Moreover, when the file extensions are queried to find dependent applications, all visible places in the computer system can be searched, including the combination of per-machine and per-user visible to the user(s) logged in when the query is run. Note that this may not necessarily find all installed applications in each case, but this technique can find most, if not all, installed applications in many situations.

When a management task is to be performed (e.g., AEE uninstall or AEE update), the AEE version management can include checking 460 for a file extension registration specific to a given AEE version before performing the management task. For example, if a user selects to uninstall version 2.0 of the AEE, a check can be made to see if any applications are registered for the file extension ".AEE-2-0", and the result of that check can affect how the requested management task is carried out.

In addition, this checking can be performed fir all currently installed AEE versions before any specific management task has been selected. For example, when a user opens the AEE management user interface, the AEE management program can determine 470 which AEE versions have dependent applications installed, which each require a particular version of the AEE to run. This can involve checking for file extension registrations specific to each of the installed AEE versions.

A user can then be provided 475 with an option to apply an available update to one or more of the AEE versions when one or more of the applications use those one or more AEE versions. Thus, AEE versions that do not have dependent applications need not be updated; although in practice, all installed AEE versions may be updated as the default action when network access is not a constraint, or the order of update may be based on application dependencies (e.g., AEE versions used most can be updated first). In addition, a user can be notified 480 regarding dependencies between the applications and the different AEE versions before uninstalling one or more of the different AEE versions from the computer. This can involve alerting the user as described above after an uninstall selection can be made, or this can involve identifying in a UI panel (e.g., UI panel 320) which of the AEE versions have dependent applications currently installed on the computer. Note that both providing 475 the update option and notifying 480 the user can be done together in a single UI panel, or these operations can be done separately.

Furthermore when a new latest version of the AEE results from a selected management task, the latest version of the AEE can be registered with the operating system as the AEE, thereby keeping the most recent version of the AEE as the single runtime environment program (having the different versions bundled therein) from the perspective of the operating system. For example, if a version 3.5 of the AEE is installed on a computer where version 3.0 was the previously installed latest version of the AEE, the version 3.5 of the AEE can be registered (in place of version 3.0) for a file extension common to all the different versions of the AEE. Thus, whenever an AEE file having that common file extension is to be opened, the most recent version of the AEE (version 3.5 in this example) will be invoked by the operating system. If it turns out that an earlier version is nonetheless needed (e.g., to complete installation of an application that relies on that earlier version to run), then the later version of the AEE can invoke the earlier version of the AEE to complete the processing.

It should be noted that a management task other than installation of a new AEE version can also result in a new latest version. For example, if a computer currently has versions 1.0, 1.5, 2.0 and 3.0 installed, uninstalling version 3.0 can result in version 2.0 becoming the new latest version. Thus, in this case, version 2.0 of the AEE will be registered with the operating system. Note also that registration of the latest AEE version with the operating system can include many operations in addition to that of registering for the common file extension. For example, the latest version of the AEE can register its management console program, which will then be the program invoked when the user opens the management user interface.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data. server, or that includes a middleware component, e.g., an application server, or that includes a front-end component, e.g., a client computer having a graphical user interface or a web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and stilt achieve desirable results. The checking for updates to installed AEE versions, and for new AEE versions, can be done automatically without user input (e.g., when an application is launched and thus the AEE is invoked), and a notification UI can be presented when a new version or update is available. Each applications may be bound to multiple versions of an application execution environment, providing flexibility in which AEE version the application uses. Application tracking need not be AEE version specific. Various mobile and other devices (e.g., having embedded operating systems) can also be supported.

What is claimed is:

1. A method comprising:
   identifying which of multiple different versions of an application execution environment are installed on a computer, the application execution environment comprising a cross-platform application program interface configured to provide services to applications that run in the application execution environment; and
   managing the different versions of the application execution environment on the computer as a single runtime environment program having the different versions bundled therein, the identifying and the managing performed using one or more of the different versions of the application execution environment.

2. The method of claim 1, further comprising binding each of the applications to one of the different versions of the application execution environment.

3. The method of claim 1, wherein the managing is performed by a management program that runs on at least one of the different versions of the application execution environment.

4. The method of claim 1, wherein each of the different versions of the application execution environment are associated with a namespace that corresponds to a directory on the computer for the version, regardless of a patch level for each of the different versions of the application execution environment.

5. The method of claim 1, wherein the different versions of the application execution environment are seen as a single program in a programs control interface of an operating system of the computer.

6. A computer program product, encoded on a computer-readable medium, operable to cause data processing apparatus to perform operations comprising:
   identifying which of multiple different versions of an application execution environment are installed on a computer, the application execution environment comprising a cross-platform application program interface configured to provide services to applications that run in the application execution environment; and
   managing the different versions of the application execution environment on the computer as a single runtime environment program having the different versions bundled therein, the identifying and the managing performed using one or more of the different versions of the application execution environment.

7. The computer program product of claim 6, the operations further comprising binding each of the applications to one of the different versions of the application execution environment.

8. The computer program product of claim 6, wherein the managing is performed by a management program that runs on at least one of the different versions of the application execution environment.

9. The computer program product of claim 6, wherein each of the different versions of the application execution environment are associated with a namespace that corresponds to a directory on the computer for the version, regardless of a patch level for each of the different versions of the application execution environment.

10. The computer program product of claim 6, wherein the different versions of the application execution environment are seen as a single program in a programs control interface of an operating system of the computer.

11. A system comprising:
a user interface device; and
one or more computers operable to interact with the user interface device and to perform operations comprising:
identifying which of multiple different versions of an application execution environment are installed on a computer, the application execution environment comprising a cross-platform application program interface configured to provide services to applications that run in the application execution environment; and
managing the different versions of the application execution environment on the computer as a single runtime environment program having the different versions bundled therein, the identifying and the managing performed using one or more of the different versions of the application execution environment.

12. The system of claim 11, the operations further comprising binding each of the applications to one of the different versions of the application execution environment.

13. The system of claim 11, wherein the managing is performed by a management program that runs on at least one of the different versions of the application execution environment.

14. The system of claim 11, wherein each of the different versions of the application execution environment are associated with a namespace that corresponds to a directory on the computer for the version, regardless of a patch level for each of the different versions of the application execution environment.

15. The system of claim 11, wherein the different versions of the application execution environment are seen as a single program in a programs control interface of an operating system of the computer.

16. The system of claim 11, wherein the one or more computers comprise the computer having the different versions of the application execution environment installed thereon, and the computer comprises the user interface device.

17. The system of claim 16, wherein the computer comprising a personal computer running a web browser or a mobile telephone running a wireless Application Protocol (WAP) browser.

\* \* \* \* \*